United States Patent
Park (10) Patent No.: US 7,767,555 B2
(45) Date of Patent: Aug. 3, 2010

(54) METHOD FOR CUTTING SUBSTRATE USING FEMTOSECOND LASER

(75) Inventor: Jeong Kweon Park, Gumi-shi (KR)

(73) Assignee: LG. Display Co., Ltd., Seoul (KR)

(*) Notice: Subject to any disclaimer, the term of this patent is extended or adjusted under 35 U.S.C. 154(b) by 28 days.

(21) Appl. No.: 11/168,953

(22) Filed: Jun. 28, 2005

(65) Prior Publication Data

US 2006/0096962 A1    May 11, 2006

(30) Foreign Application Priority Data

Nov. 5, 2004    (KR) .................. 10-2004-0089702

(51) Int. Cl.
*H01L 21/00* (2006.01)
(52) U.S. Cl. .............. 438/463; 257/E21.214; 257/E21.238; 216/94; 216/97; 216/99
(58) Field of Classification Search ........ 438/460, 438/463, 464, 940, FOR. 100, FOR. 101, 438/FOR. 410; 219/121.83; 257/E21.214; 257/E21.238; 216/94, 97, 99
See application file for complete search history.

(56) References Cited

U.S. PATENT DOCUMENTS

| | | | | |
|---|---|---|---|---|
| 6,573,026 | B1* | 6/2003 | Aitken et al. ............ | 430/290 |
| 6,841,788 | B1* | 1/2005 | Robinson et al. ....... | 250/492.3 |
| 6,902,990 | B2* | 6/2005 | Gottfried et al. ........ | 438/463 |
| 7,049,543 | B2* | 5/2006 | Roos et al. ............. | 219/121.69 |
| 7,057,135 | B2* | 6/2006 | Li ........................... | 219/121.83 |
| 2002/0115235 | A1 | 8/2002 | Sawada | |
| 2002/0177288 | A1* | 11/2002 | Brown et al. ............ | 438/463 |
| 2004/0002199 | A1* | 1/2004 | Fukuyo et al. .......... | 438/460 |
| 2004/0121493 | A1* | 6/2004 | Han et al. ................ | 438/7 |

FOREIGN PATENT DOCUMENTS

| | | |
|---|---|---|
| CN | 2439348 | 7/2001 |
| JP | 9-511688 | 11/1997 |
| JP | 2002-324768 | 11/2002 |
| JP | 2003-154517 | 5/2003 |
| JP | 2004-186200 | 7/2004 |

OTHER PUBLICATIONS

Office Action for corresponding German Patent Application No. 10 2005 030 576.8.
Office Action Issued in corresponding German Patent Application No. 10 2005 030 576.8-43; issued Feb. 20, 2008.
Office Action issued in corresponding Japanese Patent Application No. 2005-183231; issued on Apr. 10, 2008.
Chinese Patent Application issued in corresponding Chinese Patent Application No. 2005100797715; Jul. 4, 2008.

* cited by examiner

*Primary Examiner*—Matthew Smith
*Assistant Examiner*—Quovaunda Jefferson
(74) *Attorney, Agent, or Firm*—Brinks Hofer Gilson & Lione (57) ABSTRACT

A method for cutting a substrate is disclosed which uses a femtosecond laser capable of preventing thermal expansion and generation of shock waves from occurring around a region where a cutting process is carried out when the femtosecond laser is used to cut the substrate, thereby being capable of achieving a reduction in costs. The method includes the steps of arranging the substrate on a stage, and irradiating a femtosecond laser to a predetermined portion of the substrate arranged on the stage, thereby cutting the substrate along the predetermined substrate portion.

3 Claims, 6 Drawing Sheets

METHOD FOR CUTTING SUBSTRATE USING FEMTOSECOND LASER

This application claims the benefit of Korean Patent Application No. P2004-89702, filed on Nov. 11, 2004, which is hereby incorporated by reference as if fully set forth herein.

BACKGROUND OF THE INVENTION

1. Field of the Invention

The present invention relates to a method for manufacturing a liquid crystal display (LCD) device, and more particularly, to a method for cutting a substrate using a femtosecond laser, which is capable of achieving an enhancement in productivity.

2. Discussion of the Related Art

With the recent rapid development of information communication fields, displays adapted to display desired information are gaining importance. Of such information displays, cathode ray tubes (CRTs) have continuously enjoyed popularity by virtue of their advantages, including the reproducibility of diverse colors and superior screen brightness.

Due to the recent demand for large-size, portable, and high-resolution displays, flat panel displays are in high demand, in order to replace CRTs which are heavy and bulky.

Flat panel displays are useful in a wide and diverse range of applications from industrial and consumer uses to applications in aircraft and spacecraft.

Currently, there are several types of commercially-available flat panel displays, such as LCDs, electro-luminescent displays (ELDs), field emission displays (FEDs), plasma display panels (PDPs), and the like.

Manufacturing flat panel displays generally involves singulation, or separation, of a fragile substrate into unit elements using a cutting process. Normally, a plurality of unit elements such as semiconductor chips are formed on the fragile substrate in a matrix array to produce large-scale integrated circuits.

The fragile substrates used in flat panel displays are typically manufactured from glass, silicon, or ceramics. There are two representative methods used in the cutting process for separation of the fragile substrate, namely, a dicing method and a scribing method. The dicing method involves cutting grooves on a substrate using a diamond blade having a thickness of 50 to 200 µm by rotating the blade at high speed. The scribing method involves cutting grooves onto a surface of the substrate using a scribing wheel made of a diamond to form a crack in a thickness direction of the substrate. The diamond normally has having a thickness of 0.6 to 2.0 mm.

The dicing method is suitable for cutting a substrate formed with a thin film or a convex portion at a surface of the substrate because a very thin blade is used. In the dicing method, heat is generated from friction at a region where the blade cuts the substrate. Furthermore, because the cutting process is performed with cooling water being supplied to the cutting region, the dicing method is not considered to be a method suitable for a flat panel display that includes metal portions such as metal electrode layers or metal terminals.

It is often difficult to completely remove the cooling water after the cutting process. If moisture from the cooling water is not completely removed, the metal portions of the flat panel display may be eroded or rusted. Furthermore, the dicing method typically takes more time than the scribing method, lowering productivity and manufacturing efficiency.

Cooling water is not required when cutting a substrate using the scribing method, which makes the scribing method a more efficient process than the dicing method.

Figure 1:
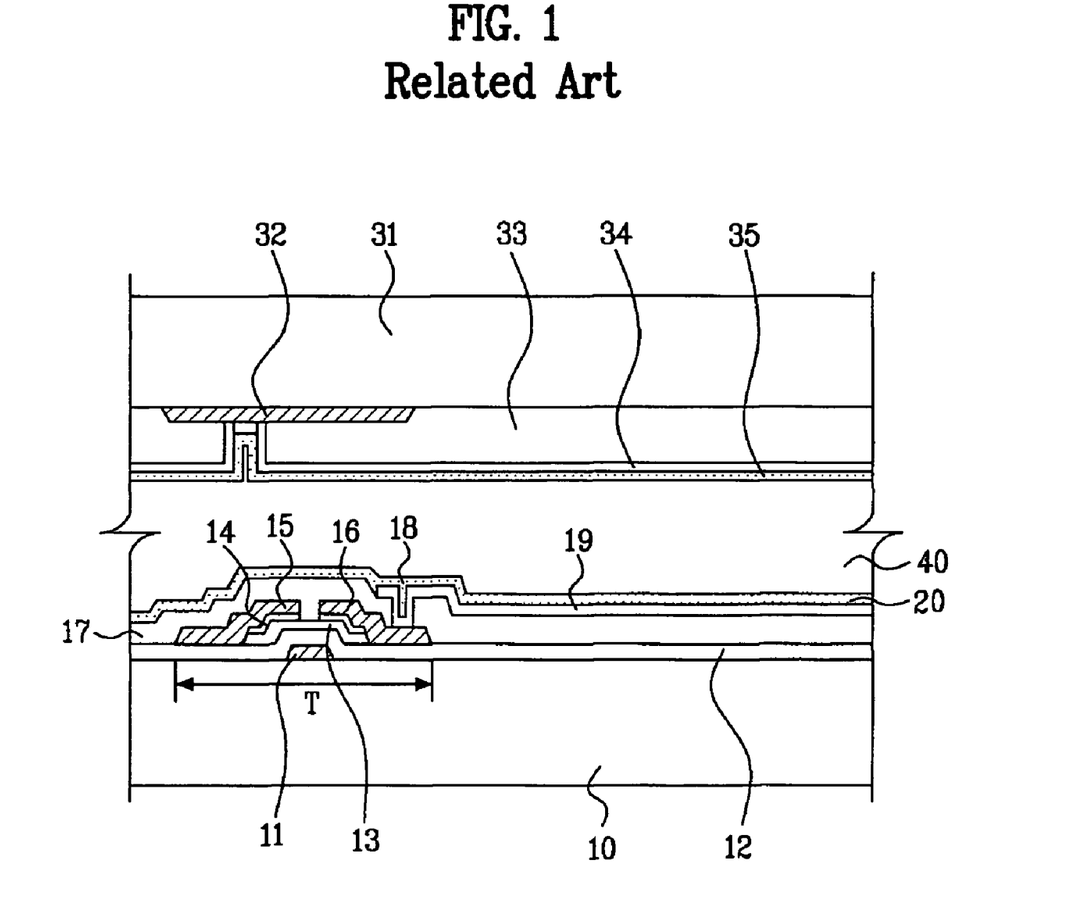
FIG. 1 is a sectional view illustrating a general LCD.

FIG. 1 is a sectional view illustrating a general LCD device. This LCD device is manufactured in accordance with the following method. For simplicity, the following description will be given only in conjunction with one pixel region, although the formation of all pixel regions is typical of this description.

As shown in FIG. 1, a gate electrode 11 that is made from a conductive material, such as metal, is first formed at a predetermined region on a first transparent substrate 10. A gate insulating film 12 made of a silicon nitride (SiNx) or silicon oxide ($SiO_2$) is then applied over the entire upper surface of the first substrate 10 including the gate electrode 11.

Thereafter, an active layer 13 made of amorphous silicon is placed on the gate insulating film 12 at a region corresponding to the gate electrode 11. An ohmic contact layer 14 is formed on the active layer 13 at regions corresponding to respective lateral edge portions of the active layer 13. The ohmic contact layer 14 is made of a doped amorphous silicon.

Source and drain electrodes 15 and 16, which are made of a conductive material such as metal, are subsequently applied on the ohmic contact layer 14. The source and drain electrodes 15 and 16 constitute a thin film transistor T, together with the gate electrode 11.

Meanwhile, although not shown, the gate electrode 11 is connected to a gate line, and the source electrode 15 is connected to a data line. The gate line and data line cross each other, and define a pixel region.

A protective film 17 is then formed over the entire upper surface of the first substrate 10 including the source and drain electrodes 15 and 16. The protective film 17 is made of a silicon nitride, silicon oxide, or organic insulating material. The protective film 17 has a contact hole 18 through which a predetermined portion of the surface of the drain electrode 16 is exposed.

Thereafter, a pixel electrode 19, which made of a transparent conductive material, is applied to the protective film 17 at the pixel region. The pixel electrode 19 is connected to the drain electrode 16 via the contact hole 18.

A first orientation film 20 is then formed over the entire upper surface of the first substrate 10 including the pixel electrode 19. The first orientation film 20 is made of, for example, polyimide, and has a surface on which the molecules of the first orientation film 20 are oriented in a predetermined direction.

Meanwhile, a second transparent substrate 31 is arranged over the first substrate 10 while being vertically spaced apart from the first substrate 10 by a predetermined distance.

A black matrix 32 is formed on a lower surface of the second substrate 31 at a region corresponding to the thin film transistor T of the first substrate 10. Although not shown, the black matrix 32 also covers a region other than the pixel electrode 19.

A color filter 33 is then formed on the second substrate 31 beneath the black matrix 32. Practically, color filters are arranged in the form of repeated filter patterns of red (R), green (G), and blue (B), each of which corresponds to one pixel region.

A common electrode 34 made of a transparent conductive material is subsequently formed on the second substrate 31 beneath the color filter 33. A second orientation film 35 is then formed on the second substrate 31 beneath the common electrode 34. The second orientation film 35 is made of, for example, polyimide, and has a surface on which the molecules of the second orientation film 35 are oriented in a predetermined direction. A liquid crystal layer 40 is sealed between the first orientation film 20 and the second orientation film 35.

The above-described LCD device is manufactured using an array substrate fabrication process that involves the formation of thin film transistors and pixel electrodes on a substrate to fabricate an array substrate, a color filter substrate fabrication process involving formation of color filters and a common electrode on another substrate to fabricate a color filter substrate, and a liquid crystal panel fabrication process involving the arrangement of the two fabricated substrates, the injection and sealing of a liquid crystal material, and the attachment of polarizing plates to fabricate a liquid crystal panel.

Figure 2:
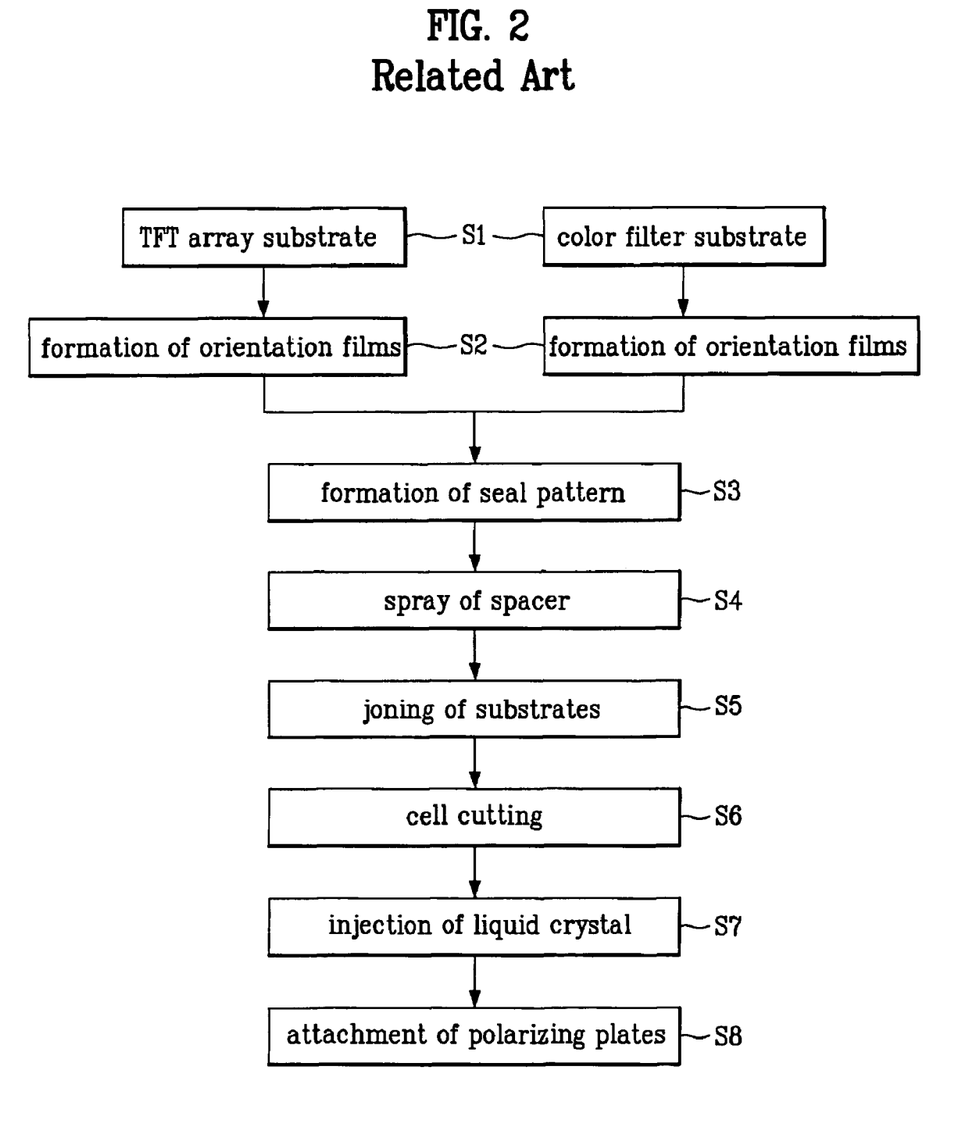
FIG. 2 is a flow chart illustrating a general LCD manufacturing method.

FIG. 2 is a flow chart illustrating a general LCD manufacturing method.

In accordance with this method, a thin film transistor (TFT) array substrate including TFTs and a color filter substrate including color filters are first prepared (S1), as shown in FIG. 2.

The TFT array substrate is fabricated by repeatedly performing the processes of depositing a thin film and patterning the deposited thin film. In this case, the number of masks used for patterning the thin films in the fabrication of the TFT array substrate represents the number of processes used in the fabrication of the TFT array substrate. Currently, research is being performed to reduce the number of masks, and thus, to reduce the manufacturing costs.

The color filter substrate is fabricated by sequentially forming a black matrix for preventing light from being leaked through a region other than from pixel regions, R, G, and B color filters, and a common electrode. The color filters may be formed using a dyeing method, a printing method, a pigment dispersion method, an electro-deposition method, or the like. Currently, the pigment dispersion method is most often used. Thereafter, an orientation film is formed over each substrate to determine an initial alignment direction of liquid crystal molecules (S2).

The formation of the orientation film is achieved using a process for coating a polymer thin film, and treating the surface of the polymer thin film such that the molecules of the polymer thin film on the treated surface are oriented in a predetermined direction. Generally, polyimide-based organic materials are mainly used for the orientation film. A rubbing method is generally used for the orientation method.

In accordance with the rubbing method, the orientation film is rubbed in a predetermined direction using a rubbing cloth. This rubbing method is suitable for mass production because it is possible to easily achieve treatment for orientation. Also, the rubbing method has advantages of stable orientation and easy control of pretilt angle.

An optical orientation method has also been developed and used which achieves orientation using polarized beams.

Next, a seal pattern is formed at one of the two substrates (S3). The seal pattern is arranged around a region where an image is displayed. The seal pattern has a port for injection of a liquid crystal material, and serves to prevent the injected liquid crystal material from being leaked.

The seal pattern is formed by applying a thermosetting resin layer in a predetermined pattern. A screen printing method using a screen mask is used when forming the seal pattern. Alternatively, a method using a seal dispenser may also be used.

The screen printing method has a drawback in that products of poor quality may be produced if the screen mask comes into contact with the orientation film. Furthermore, the screen mask process becomes more difficult and error prone with increased substrate sizes. Therefore, the seal dispenser method is being used more often because it does not have the disadvantages of the screen printing method.

Subsequently, spacers having a predetermined size are sprayed on one of the TFT array substrate and color filter substrate to maintain an accurate and uniform space between the two substrates (S4).

A wet spray method is used to spray the spacers, which involves spraying the spacers while mixed with alcohol. Additionally, a dry spray method can be used wherein spacers are sprayed without alcohol. There are two types of dry spraying methods, an electrostatic spray method using static electricity, and an ionic spray method using pressurized gas. Since LCDs are weak against static electricity, the ionic spray method is preferred.

Thereafter, the two substrates of the LCD, i.e., the TFT array substrate and color filter substrate, are arranged such that the seal pattern is interposed between the substrates. In this state, the seal pattern is cured under pressure to join the substrates (S5). In this orientation, the orientation films of the substrates face each other, and the pixel electrodes and color filters correspond to each other in a one-to-one relationship. Next, the joined substrates are cut, or singulated, into liquid crystal panels (S6).

Generally, a plurality of liquid crystal panels, each of which will be one LCD device, are formed on one substrate sheet, and are then separated into individual panels. This is done to improve the manufacturing efficiency and reduce the manufacturing costs.

The liquid crystal panel cutting process includes a scribing process for forming a crack in a surface of each substrate using a scribing wheel made of a diamond material having a hardness higher than that of the substrate, which may be made from glass or similar materials, and a breaking process for positioning a breaking bar at a portion of the substrate where the crack is formed. After the breaking bar is positioned on the substrate, a predetermined pressure is applied to the breaking bar, thereby cutting the substrate in a direction along which the crack extend.

Subsequently, a liquid crystal material is injected between the two substrates of each liquid crystal panel (S7). A vacuum injection method is often used to inject the liquid crystal, which utilizes a pressure difference between the interior and exterior of the liquid crystal panel. Micro air bubbles may be present in the liquid crystal injected into the interior of the liquid crystal panel, which cause the liquid crystal panel to have poor quality. In order to prevent such a problem, it is necessary to perform a de-bubbling process in which the liquid crystal is maintained in a vacuum state for a prolonged time to remove bubbles.

After completion of the liquid crystal injection, the injection port is sealed to prevent the liquid crystal from being outwardly leaked through the injection port. The injection port is sealed by coating the injection port with an ultraviolet-setting resin, and the coated resin is irradiated with ultraviolet rays, which sets the coated resin. Next, polarizing plates (S8) are attached to the outer surfaces of the liquid crystal panel and finally, driving circuits are connected to the liquid crystal panel.

A conventional substrate cutting apparatus and a conventional substrate cutting method using the same will be described with reference to the figures.

Figure 3:
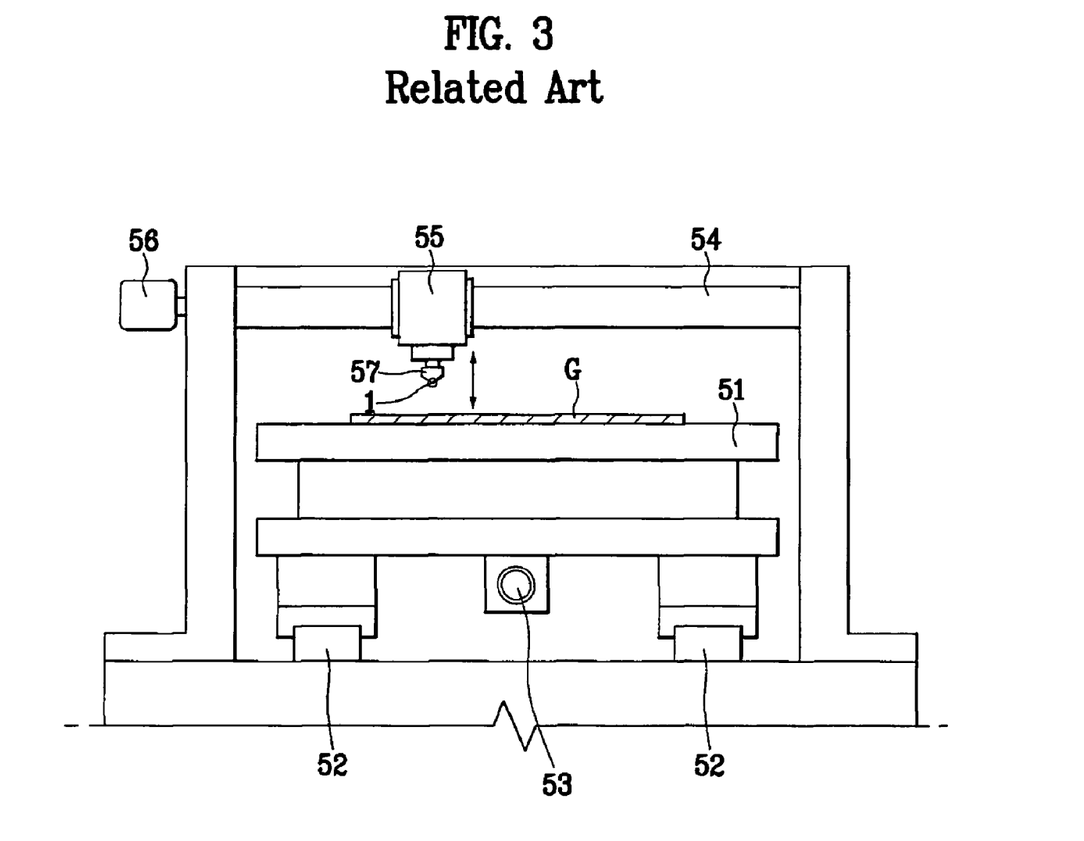
FIG. 3 is a schematic view illustrating a conventional scribing device.

FIG. 3 is a schematic view illustrating a conventional scribing device. The conventional scribing device includes a table 51, on which a substrate G is laid, and a vacuum chucking unit adapted to fix the substrate G to the table 51. Additionally, the conventional scribing device includes and a pair of parallel guide rails 52 for pivotally supporting the table 51 in a suspended state while allowing the table 51 to be movable in a Y-axis direction. The scribing device also includes a ball screw 53 for moving the table 51 along the guide rails 52, a guide bar 54 installed above the table 51 such that the guide bar 54 extends in an X-axis direction, and a scribing head 55 mounted on the guide bar 54 such that the scribing head 55 is slidable in the X-axis direction along the guide bar 54. The scribing device further includes a motor 56 for sliding the scribing head 55, a tip holder 57 mounted to a lower end of the scribing head 55 to be vertically movable as well as rotatable, and a scribing wheel 1 rotatably mounted to a lower end of the tip holder 57.

In the conventional substrate cutting method using the above-mentioned scribing device, a crack with a predetermined depth is formed in a substrate to be cut, based on the rotation of the scribing wheel 1. The substrate with the crack is then fed into a breaking device, which applies pressure to the substrate along the crack using a breaking bar to cut the substrate.

Figure 4:
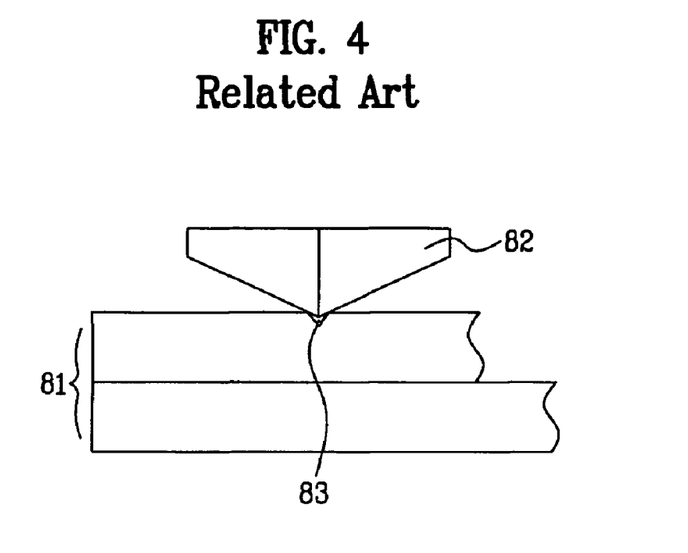
FIGS. 4 and 5 are schematic views respectively illustrating scribing and breaking processes involved in the conventional substrate cutting method.
Figure 5:
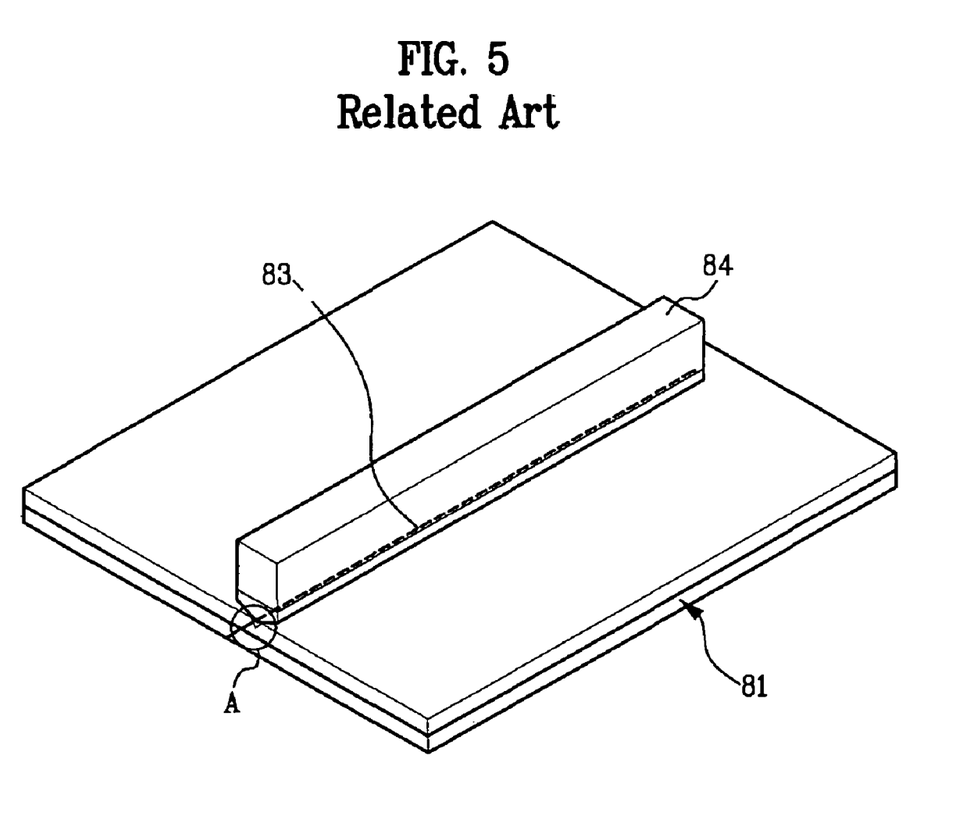

FIGS. 4 and 5 are schematic views respectively illustrating scribing and breaking processes involved in the conventional substrate cutting method. In the scribing process as shown in FIG. 4, a scribing or cutting wheel 82 makes contact with the surface of a substrate 81. The scribing wheel 82 is rotated along the substrate 81 while applying a pressure of about 2.40 Kgf/cm² to the substrate 81, which forms a crack 83 having a predetermined depth on the surface of the substrate 81 along the track of the scribing wheel 82.

Next, the breaking process to cut the substrate 81 is performed along the crack 83 formed to the predetermined depth in the surface of the substrate 81. As shown in FIG. 5, a breaking bar 84 is arranged on the substrate 81 along the line of the crack 83. The portion of the breaking bar 84 that contacts the substrate 81 is made of a material such as urethane rubber that is sufficiently hard, but does not form scratches on the surface of substrate 81.

Pressure is momentarily applied to the substrate 81 with the breaking bar 84, which causes the crack 83 to be extended and splits the substrate along the line of the crack.

Thereafter, a grinding process is then performed using a grindstone having a predetermined mesh size, to grind the cut surfaces and corners of the substrate formed during the scribing and breaking processes.

This conventional substrate cutting method has various problems or disadvantages. One major disadvantage is that the scribing wheel used for cutting the substrate is expensive and has a short lifespan, which requires periodic replacement of the scribing wheel. The scribing wheels are relatively expensive and the replacement cost is a large percentage of the manufacturing cost of the units. For this reason, an increase in manufacturing costs is incurred.

SUMMARY OF THE INVENTION

A method for cutting a substrate using a femtosecond laser is provided. The method comprises the steps of providing a substrate on a stage, and irradiating a femtosecond laser to a predetermined portion of the substrate arranged on the stage, thereby cutting the substrate along the predetermined substrate portion.

Additional advantages, objects, and features of the invention will be set forth in the description which follows and will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Generally, ablation, or cutting by a laser, is used in manufacturing high-accuracy precise elements. High-speed laser pulses are used because these reduce damage to the substrate around the region where the laser pulses are irradiated. Because of this advantage in using lasers with high-speed pulses, laser machines using a YAG laser, or excimer laser, having a pulse speed on the order of nanoseconds, i.e., $10^{-9}$ m/s, are generally used in applications where high accuracy substrate cuts are required. These machines are called a "nanosecond laser machines."

However, YAG laser machines, in which an aluminum oxide is artificially crystallized to generate a laser, are problematic because side walls machined by a YAG laser tend to be rough. Carbon dioxide lasers, which are infrared-based, often form craters at the machined region. Therefore, $CO_2$ lasers cannot be used for a micro machining process that requires accuracy in the order of micrometers or higher.

The laser machines described above are often referred to as a "thermal laser machining," because the machining is performed using thermal energy changed from optical energy. It is difficult to achieve precise machining using these machines because the machined structure may be easily collapsed when using thermal laser machines.

On the other hand, in the case of an excimer laser, sublimate etching is performed with an opto-chemical reaction that causes disconnection of the covalent bonds between carbon atoms. Very precise machining is possible using this process. That is, when an excimer laser is irradiated to the surface of an object to be machined, the irradiated surface of the object is dissipated by forming plasma and shock noise.

However, the energy of an excimer laser is not completely used for the disconnection of the covalent bonds of carbon atoms. Instead a portion of the excimer laser energy is converted to thermal energy. The effect of the converted thermal energy is considerable because the excimer laser energy has a high density. Therefore, it is difficult to machine mineral materials using the excimer laser such as metal, ceramic, silicon, quartz, and glass that have a low photo absorption rate. Thermal deformation generated by an excimer laser adversely affects the durability of the machined product, even through the thermal deformation is less than that produced with thermal laser machining.

On the other hand, a femtosecond laser, which has a pulse speed of approximately $10^{-15}$ m/s, has superior characteristics that are capable of solving the above-described problems. It is possible to obtain a very high oscillation density of laser energy by using a laser that oscillates with an ultra-short pulse radiation duration of 1 picosecond ($1 \times 10^{-12}$ m/s) or shorter.

When a laser has photo energy of 1 mJ, and a pulse radiation duration of 100 femtoseconds or shorter, the energy density of the laser reaches a level of about 10 Gigawatts. Under these circumstances, it is possible to accurately machine nearly any material.

Meanwhile, when an ultra-short pulse laser, such as a femtosecond laser, is radiated to an object to be machined, a multiphoton phenomenon occurs in the lattices of the material of the object, which causes the atoms within the material to be excited. However, the incident laser pulse duration is shorter than the time required for photons to transfer heat to the lattices around the photons during the excitation of the atoms. Therefore, it is possible to accurately machine a substrate without the problems associated with other equipment and methods, such as, thermal degradation, physical and chemical variation in the properties of the material due to the machining process, and partial melting of the machined portion of the object.

Moreover, particles do not accumulate during the femtosecond laser machining, and little or no byproducts, or craters are formed. Therefore, when using the femtosecond laser, it is unnecessary to use a byproduct removing process, such as an ultrasonic cleaning process, as is required when using conventional cutting methods.

Additionally, it is possible to machine a material that has a high heat transfer coefficient or a low photo absorption rate. It is also possible to machine two or more different materials, or a composite material having a multi-layer structure, using a single process.

Hereinafter, a method for cutting a substrate using a femtosecond laser in accordance with the present invention will be described with reference to the annexed drawings.

Figure 6:
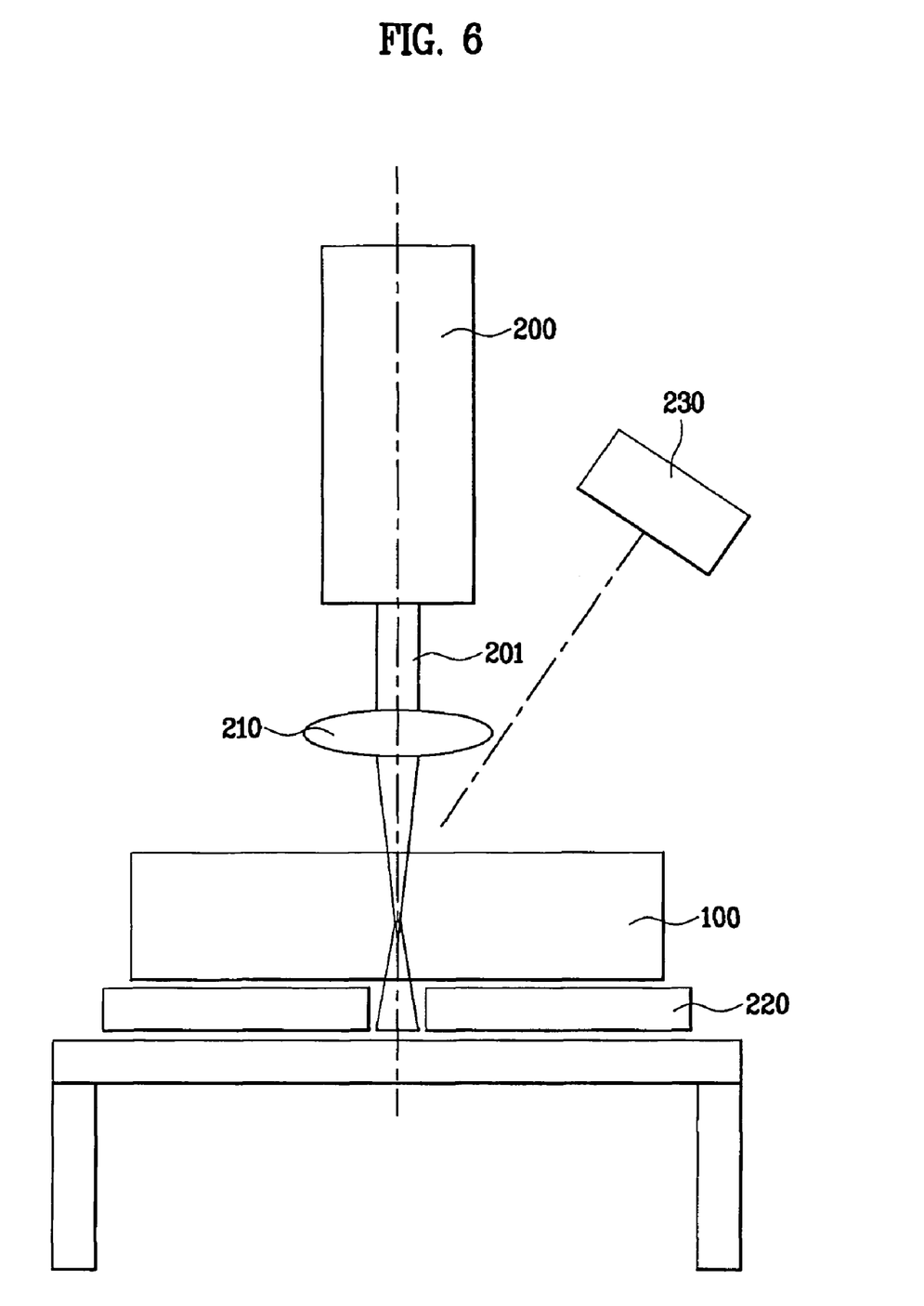
FIG. 6 is a schematic view explaining a method for cutting a substrate using a femtosecond laser in accordance with the present invention.

FIG. 6 is a schematic view explaining the method and components used in cutting a substrate using a femtosecond laser in accordance with the present invention. A femtosecond laser generating apparatus according to the present invention is illustrated. The femtosecond laser generating apparatus includes a femtosecond laser oscillator 200 for generating a femtosecond laser 201 and a condenser lens 210 for focusing the femtosecond laser 201 emitted from the femtosecond laser oscillator 200 onto a substrate 100 to be cut.

In accordance with the method of the present invention, the femtosecond laser 201 generated from the femtosecond laser oscillator 200 having the above-described configuration is irradiated to the substrate 100, thereby cutting the substrate 100.

Since the femtosecond laser 201 has a short pulse width (about 150 fs) and a high peak power per pulse, thermal expansion and generation of shock waves do not occur around a portion of the substrate 100 that is cut during the cutting operation.

Meanwhile, the femtosecond laser has characteristics different from those of general lasers. The femtosecond laser has a considerably wide spectrum range, while typical lasers are normally monochromatic.

Also, the femtosecond laser is amplified through the condenser lens 210 and has a peak power on the order of terawatts ($10^{12}$ watts), which is much higher than those of general lasers. Recently, such an amplified femtosecond laser has exhibited a peak power increased to petawatts ($10^{15}$ watts). The femtosecond laser may be called a "T3 laser" (Table Top Terawatt Laser). It is possible to greatly increase the density of the laser by simply condensing the laser through a condenser lens. Accordingly, because the energy of the laser can be constrained into a small area with a condenser lens, the material of the focus point of the laser is transformed to a plasma state, virtually instantly.

Normally, a femtosecond laser exhibits a pulse energy on the order of micro-Joules (μJ) per pulse. In some cases, the femtosecond laser uses stronger pulse energy, on the order of milli-Joules per pulse, corresponding to mean power of about 1 Watt.

Normally, plasma generated by a laser reacts with the laser light to absorb the laser or to heat the material to be machined. As a result, such plasma causes various problems such as increased heating, unstable machining, and degradation in efficiency. However, the femtosecond laser changes such circumstances caused by plasma.

Generally, the laser energy is received by an acceptor electron at the side of the material being machined. In the case of a metal, the acceptor is a free electron existing in a conduction band or an electron excited into the conduction band by light. The electron (electron system) is vibrated by a vibrating electric field of the laser. In other words, the electron receives energy from the laser. The vibrating electron strikes atoms or ions in the lattices of the material (lattice system), transferring kinetic energy to the atoms or ions. This transfer of energy causes an increase in the material's temperature. As a result, the phase of the material is changed (by either melting or evaporation), which causes the material to be machined.

For example, the time taken for the atoms of the irradiated material to be ionized, and thus, to generate plasma, is longer than the pulse width of the femtosecond laser. Accordingly, with femtosecond machining it is expected that the plasma will not react with the laser. Furthermore, the time taken for the heat generated at the irradiated region to be diffused around the irradiated region is longer than the pulse width of the femtosecond layer. The energy of the laser exists locally in the irradiated region, so that the phase change of the material occurs only in the irradiated region.

Thus, when a substrate is cut using the femtosecond laser in accordance with the present invention, the cutting is achieved without formation of a heat affected zone around the region where the cutting is carried out.

Hereinafter, the substrate cutting method using the femtosecond laser according to the present invention will be described in more detail in conjunction with the femtosecond laser generating apparatus of FIG. 6.

In accordance with this substrate cutting method, a substrate 100, which is a mother substrate formed with a plurality of liquid crystal panels that are to be cut into unit liquid crystal panels, is first arranged on a movable stage (220). Thereafter, a femtosecond laser 201 is generated from the femtosecond laser oscillator 200.

Meanwhile, when the femtosecond laser 201 is generated from the femtosecond laser oscillator 200, the cutting position on the substrate is identified using the CCD camera (230). Also, an image of the substrate 100 is displayed in order to aid in accurate cutting of the substrate 100.

Subsequently, the intensity and density of the femtosecond laser 201 generated from the femtosecond laser oscillator 200 are adjusted. The adjusted femtosecond laser 201 is focused by the condenser lens 210, and irradiated onto a cutting surface of the substrate 100. Thereafter, the substrate 100 is cut while moving the stage in one direction in accordance with a signal from a controller (not shown). Alternatively, the substrate 100 cut while moving the femtosecond laser oscillator 200 in one direction in a fixed state of the stage. A monitoring device (not shown) may be additionally provided in order to allow the operator to check the cutting condition during the cutting process.

Figure 7:
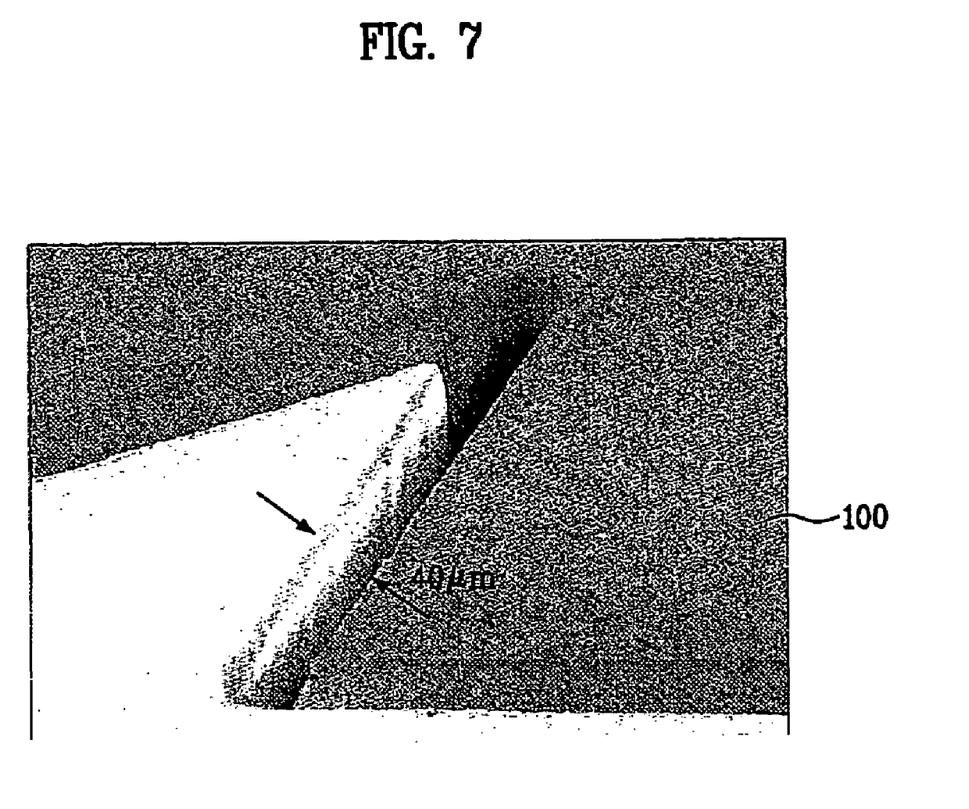
FIG. 7 is a photograph showing the cut state of the substrate after the substrate cutting process is carried out using the femtosecond laser in accordance with the present invention.

FIG. 7 is a photograph showing the cut state of the substrate after the substrate cutting process is carried out using the femtosecond laser in accordance with the present invention. It can be seen that the substrate 100 was uniformly and accurately cut in a desired cutting direction under the condition in which the cutting width was about 40 µm. This is because neither thermal expansion nor generation of shock waves occurred around the region where the cutting was carried out. Thus, when the substrate is cut using the femtosecond laser, it is possible to accurately and cleanly cut the substrate without formation of paddings or deposits on the edge and side surfaces of the cut substrate portion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the substrate cutting method using the femtosecond laser according to the present invention has various effects. That is, the femtosecond laser used in accordance with the present invention has a short pulse width and high peak power, so that neither thermal expansion nor generation of shock waves occurs around a region where cutting is carried out. Additionally, the femtosecond laser does not require the periodic replacement of a scribing wheel incurred in conventional cases, which reduces manufacturing costs.

What is claimed is:

1. A method for cutting a substrate, comprising the steps of:
arranging a substrate on a stage;
generating a femtosecond laser from a femtosecond laser oscillator;
condensing the generated femtosecond laser through a condenser lens, wherein the femtosecond laser generated from the femtosecond laser oscillator is directly irradiated to the condenser lens, wherein a width direction of the condenser lens is parallel to a width direction of the stage on which the substrate is arranged;
irradiating the condensed femtosecond laser to a predetermined portion of the substrate arranged on the stage, thereby cutting the substrate along the predetermined substrate portion under a condition in which the cutting width is about 40 µm, as well as moving the stage or moving the femtosecond laser with respect to the stage, wherein the condensed femtosecond laser from the condenser lens is directly irradiated to the substrate;
identifying a cutting position on the substrate by a CCD camera arranged between the condenser lens and the predetermined portion of the substrate arranged on the stage;
monitoring a cutting condition when the substrate is cut, to allow an operator to identify the cutting condition; and
adjusting an intensity and a density of the femtosecond laser generated from the femtosecond laser oscillator, wherein the adjusted femtosecond laser is directly focused by the condenser lens, and is then irradiated to the predetermined portion of the substrate,
wherein the CCD camera is directly focused on the connection between the femtosecond laser and the predetermined portion of the substrate arranged on the stage,
wherein the femtosecond laser amplified through the condenser lens has a peak power of about terawatts ($10^{12}$ watts) to petawatts ($10^{15}$ watts) and uses a pulse energy of about micro-Joules (µJ) per pulse to milli-Joules per; and
wherein a hole is formed in the stage corresponding to the portion of the substrate irradiated the condensed femtosecond laser.

2. The method according to claim 1, wherein the cutting of the substrate comprises moving the stage in one direction and fixing the femtosecond laser oscillator.

3. The method according to claim 1, wherein the cutting of the substrate is carried out in accordance with a movement of the femtosecond laser oscillator in one direction in a fixed state of the stage.

* * * * *